Figure 1:
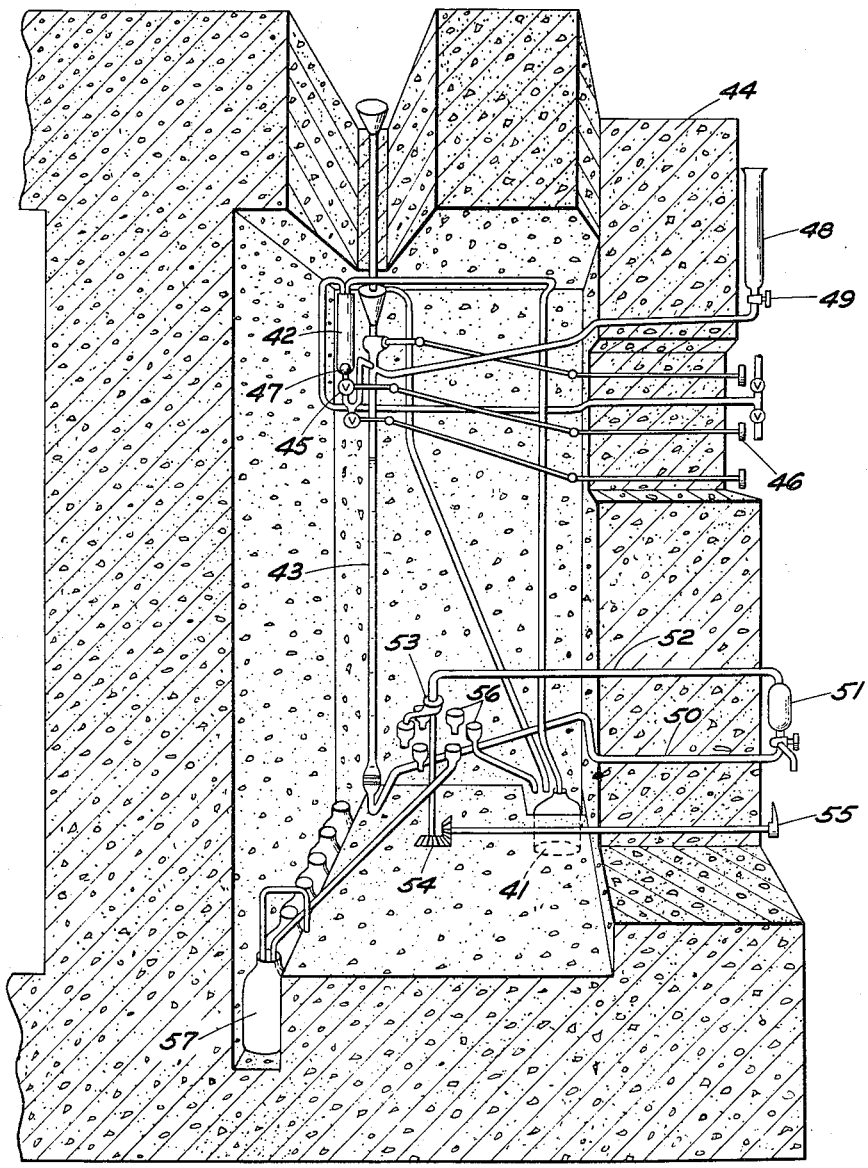

Inventor
Edward R. Tompkins

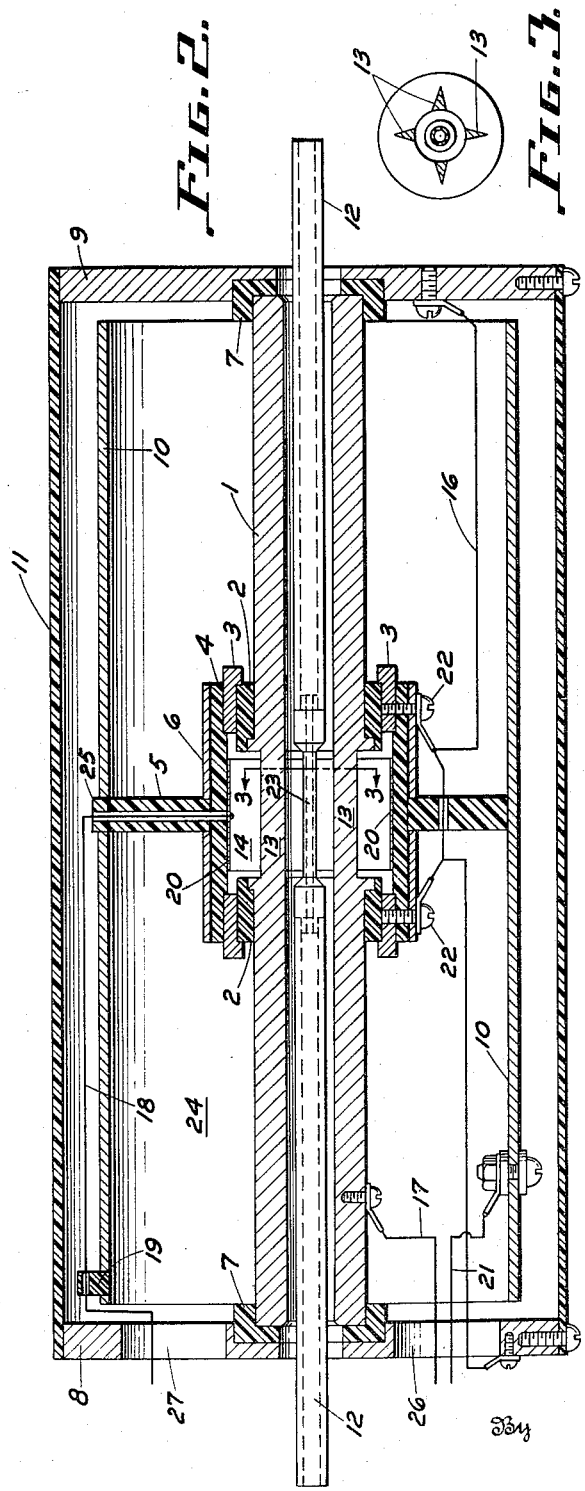
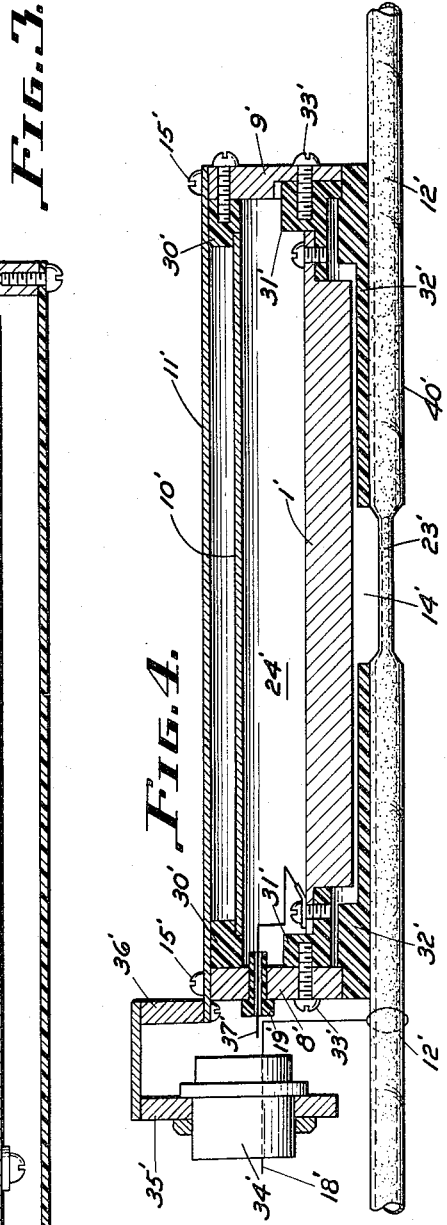

Patented Jan. 16, 1951

2,538,632

UNITED STATES PATENT OFFICE 2,538,632

COMBINATION BETA AND GAMMA CHAMBER

Edward R. Tompkins, Oak Ridge, Tenn., assignor to the United States of America as represented by the United States Atomic Energy Commission Application January 21, 1948, Serial No. 3,484

9 Claims. (Cl. 250—83.6)

My invention relates to monitoring systems, and more particularly to arrangements for monitoring fluids to determine the radioactivity of such fluids, and for independently measuring the relative beta and gamma activity therein.

In the prior art it has been the practice to test for beta activity in gases by feeding samples of a gas to an ionization chamber where electrodes therein are joined to appropriate indicating or recording equipment. This arrangement is satisfactory for dry non-corrosive gases. However, it is not suitable for handling liquids or corrosive gases.

In using ionization chambers, it was generally the practice to extract gas samples, but, when dealing with quantities of radioactive materials, it is necessary to place the materials behind thick barriers, and it would not be feasible to attempt sampling them in this manner. Even if the samples were obtained, it would be necessary to periodically interrupt the process where it was continuous in nature, and the results obtained would only be of the average instead of the instantaneous activity.

The use of the ionization chamber is also objectionable in that at any instant a large volume of gas is required for operation, and measurements only reflect average radioactivity. Moreover, with a low rate of flow to an ionization chamber of large volume, changes in activity are not readily and accurately measured. Damp or corrosive vapors cannot be tested since they will attack the electrodes and other material of the ion chamber which is subject to corrosion, and it is not feasible to attempt to make all of the elements of the ionization chamber of material which will withstand corrosion.

Applicant with a knowledge of these problems and defects in the prior art has for an object of his invention the provision of a system for monitoring both liquids and gases to determine the radioactivity thereof.

Applicant has as another object of his invention the provision of a system for continuously monitoring gases or liquids for determining their radioactivity, and which is sensitive to small changes in radioactivity in such gases or liquids.

Applicant has as a further object of his invention the provision of a monitoring system for continuously monitoring small quantities of liquids or gases and which will withstand the corrosive action of such liquids or gases.

Applicant has as a further object of his invention the provision of a monitoring system for separately indicating the beta and gamma activity in liquids or gases.

Applicant has as a still further object of his invention the provision of a system for continuously monitoring the products of the process of radiochemical isolation and chemical purification of the major fission species accomplished by an absorption elution cycle for determining the radioactivity thereof.

Other objects and advantages of my invention will appear from the following specification and accompanying drawings and the novel features thereof will be particularly pointed out in the annexed claims.

In the drawings, Fig. 1 is a schematic of one system employing my improved monitoring arrangement for determining the radioactivity of fluids. Fig. 2 is a cross sectional view of one form of my improved instrument for determining the radioactivity of fluids. Fig. 3 is a detail section view of the high voltage electrode cylinder taken along the line 3—3 of Fig. 2. Fig. 4 is a fragmental sectional view of another or modified form of instrument for measuring the radioactivity of fluids.

This invention is of general application in the monitoring of liquids and gases to determine the radioactivity therein and may be employed for a variety of other purposes, such as to determine the extent of mixing of a solution or mixture by using a radioactive tracer in the solution or mixture and monitoring it with my improved system. One specific application of this invention is in the monitoring of activity eluted from the resin bed in an absorption elution cycle of radiochemical isolation and chemical purification of the major fission species in order to know when to collect an emergent active species and when to discard inactive fluids.

Referring to the drawings in detail, and particularly to Fig. 2, a polystyrene or glass tube 12 is provided for the passage of gas or a liquid such as citric acid or citrates which will elute or exchange ions. The tube is preferably about 10½ inches long, and the walls of the main body of the tube are thick, but the walls of the central portion are reduced to about 0.1 mil thickness over a length of about 1½ inches to permit the passage of beta rays. It will be understood that the thicker walls of the tube while acting as a barrier against beta radiations, cannot obstruct the passage of gamma radiations. Disposed about the tube 12 in spaced relation thereto is a cylinder 1 of aluminum or other appropriate material which acts as the high voltage electrode for both the beta and the gamma chambers to be referred to more in detail hereinafter. Cylinder 1 is preferably at a positive potential of about 130 volts and is sufficiently thick to absorb out beta particles. As will be seen in Fig. 3, portions of the walls of the intermediate part of the cylinder 1 are cut away to define a series of spaced arms 13, 13. The spaces or windows between the arms serve as passageways for the egress of beta particles.

Disposed about the cylinder 1 and engageable with peripheral shoulders thereon are insulating rings 2, 2 of polystyrene or other suitable material. Disposed about the rings 2, 2 in spaced relation thereto to define a chamber 14 is an insulating cylinder 4 of Bakelite or other insulating material. Interposed between the rings 2, 2 and the insulating cylinder 4 are metal guard rings 3, 3 at ground potential to obviate surface leakage. Surrounding the insulating cylinder 4 is a thin cylinder 6, preferably of lead, for absorbing out any betas which pass through cylinder 4. The insulating cylinder 4 has a coating of foil 20 on its inner surface which acts as a collecting electrode for the beta chamber. Disposed about the cylinder 4 is an insulating disk 5, such as polystyrene, or Bakelite, for supporting the gamma collecting electrode 10 which takes the form of a cylinder of aluminum or other material. The disk 5 is adapted to cooperate with an insulating bushing 25 in a manner to be described hereinafter. The bushing 25 is preferably cemented in place in the opening of the wall of cylinder 10.

The above structure is inclosed in a cylindrical casing which includes an outer shell 11, preferably of Bakelite, and ends 8, 9 of aluminum or other suitable material. The ends 8, 9 are of disc-shape and fit within the shell 11. They are maintained therein by a plurality of spaced screws which pass through openings in the shell and thread into the circumferential edges of the discs 8, 9. Cylinder 1 is supported by the ends 8, 9 through cup-shaped insulators 7, 7 seated in the recesses in ends 8, 9 and receive the extremities of the cylinder 1. The tube 12 is in turn clamped in the cylinder 1 in spaced relation thereto by appropriate spacing bushings (not shown) or otherwise. Openings 26, 27 in end 8 permit the passage of electrical leads or serve to mount plugs of conventional type to which the leads referred to hereinafter are joined. Lead 16 serves to ground cylinder 6 and rings 3, 3 to ends 8, 9, the rings 3, 3 being joined thereto with terminal screws 22, 22. Lead 17 from an appropriate electrical source of potential passes through opening 26 in end 8 and is joined to cylinder 1. It serves to maintain the cylinder at a high positive potential. Lead 18 passes through opening 27 in end 8 and through insulator 19 and alined openings in bushings 25 and disk 5, serving to join the foil coating 20, on the inner surface of inner cylinder 4 to an amplifier and indicator or recorder located outside of the shell 11. Likewise lead 21 passes through the opening 26 in end 8 and serves to join the gamma collector electrode 10 to an appropriate amplifier and indicator or recorder, also located externally of shell 11.

In its operation, liquid or gas from an appropriate source is passed through tube 12, preferably continuously. The thick walls of the tube, except for the central portion 23 where the walls are thin, effectively stop most of the beta radiations and the balance is absorbed out by the aluminum high voltage cylinder 1. The walls of the central portion 23 of tube 12, being thin, permit the passage of betas which travel on into the ionization chamber 14 through the windows between the arms 13, 13. They ionize the gas of the chamber, which is usually air, and the ions are collected and neutralized on the collector electrode 20, the current passing through lead 18 to an amplifier and indicator or recorder of conventional construction. Gamma radiations also pass through tube portion 23 and enter chamber 14, but due to the small volume of this chamber, the ionization caused by the gamma radiations is negligible.

Gamma radiations, being more penetrating than the beta particles, pass through the thick walls of tubes 12 and 1 and into the larger ionization chamber 24 defined by cylindrical electrode 10. This ionizes the gases (usually air) in the chamber and the ions are collected and neutralized on electrode 10. The charge given up is fed through lead 21 to an amplifier and recording or indicating apparatus where it is measured in the usual manner.

Fig. 4 shows a quarter section of a modified form of a combination beta and gamma chamber wherein 12' represents the delivery tube. The ionization due to beta activity takes place in the chamber 14' which is actually cylindrical and is represented by revolving the quarter section about the center line of tube 12'. Cylindrical electrode 1' acts as the high voltage electrode while the thin walled portion 23' of tube 12' permits the betas to enter the space 14' without excessive absorption. Tube 12' also acts as a collecting electrode for the beta chamber, and its surface is rendered conductive by coating with colloidal suspension of graphite 40'. Electrode 1' serves to shield the gamma chamber 24' from the beta rays and also acts as high voltage electrode for both chambers. The gammas easily penetrate electrode 1' and enter chamber 24' where they ionize the gas. Cylindrical electrode 10' acts as a collecting electrode for the gamma chamber. The housing for the chambers is similar to that previously described in connection with Fig. 2 wherein 8', 9' are discs fitted within the cylindrical body portion 11' with appropriate screw 15', 15'. Insulating rings 30', 30' serve to mount electrode 10', and rings 31', 31' joined to ends 8', 9' by screws 33', 33' serve to mount voltage electrode 1'. Insulating tubes 32', 32' interposed between tube 12' and ends 8', 9' serve to maintain the delivery tube in spaced relation to the housing. A conventional plug 34' is mounted on disc 35 which is in turn carried by body 11' through frame or flanged cylinder 36'. Lead 37' from the high voltage source of potential passes through insulating bushing 19' and serves to provide operating potential for the electrode cylinder 1'. Lead 18' joins the conductive coating on tube 12' and leads to appropriate amplifying and indicating or recording equipment for measuring beta radiation. While not so clearly shown in the drawing, it is apparent that the reduced portion 23' of tube 12' may likewise be coated with aquadag, or at least partially coated where conditions are found to justify it. An appropriate lead (not shown) may also connect electrode 10' to similar equipment for measuring gamma radiation. Plugs such as 34', and insulating bushings such as 19' may be employed in such arrangements to provide insulated passage for the leads.

The foregoing chambers may be employed for monitoring liquids in a system, such as is disclosed schematically in Fig. 1. In that system gravity flow of active throughput or liquid passing through the column is achieved by drawing the solution from storage bottle 41 up into a burette 42 above the column. From the burette it is permitted to run through the column 43 containing a resin, the rate being observed through an appropriate periscope in the wall of the barrier 44 by observing the markings on the burette, and such flow being remotely controlled by a stainless steel needle valve 45 and knob 46 on the outside of the barrier. As a safety device, to prevent the column from running dry, a close fitting flow valve 47 is included in the burette 42.

Washing and eluting solutions may be introduced either through the burette 42 used for active throughput or, since they are "cold" at the start, through a burette 48 mounted on the outside of the shielding 44. The rate of flow is controlled by stopcocks such as 49.

The lower end of the column 43 which is filled with an ion-exchange resin, is connected to tubing 50 which passes out through barrier 44, and is joined to my improved flow type ionization chamber 51 on the outside of the barrier 44, which is preferably constructed of concrete several feet thick to offer protection against harmful radiations. The liquid flowing through the ionization chamber is returned by tubing 52 to selector funnel 53 controlled by gear arrangement 54 and combination handle and pointer 55 to select one of a series of funnels 56, 56 which lead to storage bottles 57. The flow chamber 51 is connected to an appropriate amplifier and recording milliammeter arrangement to permit continuous observation and recording of the activity of the eluate in terms of relative ionization as heretofore described in connection with the two modifications of my improved ionization chamber.

With the foregoing arrangement, it will be seen that the ionization chamber 51 will serve to indicate whether activity is being eluted in order to know when to collect the emergent active species and when to segregate them from the inactive species in the storage bottles 57.

It will be understood that the schematic of Fig. 1 is illustrative of only one possible use of the invention. It may have many and varied other uses. For the sake of simplicity supports for the funnels have been omitted, as have various bearings for the moving parts. Certain lines and connections have also been omitted, but it will be apparent that these features may easily be supplied without invention by those skilled in the art. Furthermore, the details of this particular system constitute no part of this invention, but simply give an indication of one use of such invention.

Having thus described my invention, I claim:

1. A monitoring device for measuring radioactivity of fluids comprising a housing, a tubular element passing through the housing to provide a passage for the continuous flow of fluids, said element being transparent throughout to the passage of gamma radiation while retarding beta radiation, said element also having only an intermediate portion transparent to beta radiation, and means selectively responsive to the gamma and the beta radiation from the fluids for providing a measure of the intensity thereof, said means including chambers within the housing.

2. A monitoring device for measuring radioactivity of fluids comprising a housing, a thickened tubular element passing through the housing to define a passage for the flow of fluids and for retarding beta radiation, said element being transparent throughout to the passage of gamma radiation and having an intermediate portion which is transparent to beta radiation, and collector means disposed within said housing and selectively responsive to the gamma and the beta radiation for providing a measure of the relative intensity thereof.

3. A monitoring device for measuring radioactivity of fluids comprising a housing, concentrically positioned chambers in said housing, a tubular element passing through the housing and chambers to provide a passage for the flow of fluids, said element being transparent throughout to the passage of gamma radiation while retarding the passage of beta radiation, said element also having an intermediate portion adjacent one of said chambers which is transparent to beta radiation, and separate ion collecting means in said chambers for providing currents which are proportional to the beta and the gamma activity therein.

4. A monitoring device for measuring radioactivity of fluids comprising a housing, chambers in said housing, a thickened tubular element passing through the housing and said chambers to define a passage for the flow of radioactive fluids, said element being transparent to the passage of gamma radiation into said chambers to ionize the gases therein while retarding the passage of beta radiation, said element also having a cut-away intermediate portion adjacent one of said chambers transparent to beta radiation therethrough for ionizing the gases in one of said chambers, and electrodes in said chambers for collecting the ions to provide a measure of the intensity of the respective radiations.

5. A monitoring device for measuring radioactivity of fluids comprising a housing, a tubular element passing through the housing to define a passage for the flow of fluids, said element being transparent throughout to the passage of gamma radiation, a hollow cylindrical element concentrically positioned with respect to said tubular element and providing in combination with said housing an ionizing chamber, and means positioned in said chamber for collecting ions to provide a measure of gamma radiation.

6. A monitoring device for measuring radioactivity of fluids comprising a housing, a thick walled tubular element passing through the housing to define a passage for the flow of fluids, the walls of said tubular element serving to retard the passage of beta radiation, said walls being cut away at an intermediate portion to permit the egress of beta radiation therethrough, an electrode positioned about the tubular element and in spaced relation thereto, said electrode being maintained at a positive potential to attract the particles of radiation to ionize gases in the housing, and means for collecting the ions to provide a measuring of the beta radiation.

7. A monitoring device for measuring radioactivity of fluids comprising a housing, a tubular element passing through the housing to define a passage for the flow of fluids, said element having only an intermediate portion transparent to beta radiation, a tubular electrode disposed within the housing and extending along said tubular element in spaced relation thereto, windows in said electrode for the passage of said beta radiation, a chamber in said housing for communication with said windows for the reception of ions resulting from the activity of beta radiation, and collector means in said chamber for accumulating said ions to provide a measure of beta radiation.

8. A monitoring device for measuring radioactivity of fluids comprising a housing, a thickened walled tubular element passing through the housing to define a passage for the flow of fluids while retarding beta radiation, said element having its walls cut away at an intermediate portion to permit the egress of beta radiation therethrough, a chamber in said housing for reception of beta radiation to ionize the gases therein, a cylindrical electrode disposed about said tubular element and in spaced relation thereto for attracting the beta radiation, said electrode having windows therein adjacent the cut-away portion of the tubular element to permit passage of beta particles into said chamber, and collector means in said chamber for accumulating ions to provide a measure of beta radiation.

9. A monitoring device for measuring radioactivity of fluids comprising a housing, a tubular element passing through the housing for conveying radioactive fluids, said element being transparent throughout to gamma radiation and having only an intermediate portion freely transparent to beta radiation, a high voltage tubular electrode disposed about said element to absorb beta radiation, said electrode having cut-away portions in alignment with the intermediate portion of said tubular element to permit the passage of beta radiation, a chamber in communication with said cut-away portions of said electrode to receive beta radiation for ionization of gases therein, a second chamber disposed within said housing and about said first chamber for receiving gamma radiation, and collector means in said chambers for accumulating ions to provide a measure of beta and gamma radiation.

EDWARD R. TOMPKINS.

REFERENCES CITED

The following references are of record in the file of this patent:

UNITED STATES PATENTS

| Number | Name | Date |
| --- | --- | --- |
| 2,285,840 | Scherbatskoy | June 9, 1942 |
| 2,340,967 | Langer | Feb. 8, 1944 |
| 2,367,949 | Langer | Jan. 23, 1945 |
| 2,368,486 | Mullane | Jan. 30, 1945 |
| 2,465,821 | Smoluchowski | Mar. 29, 1949 |

OTHER REFERENCES

Korff, Electron and Nuclear Counters, D. Van Nostrand Company, New York, April, 1946, pages 13, 25, 26 and 129.